US007669696B2

(12) United States Patent
Osmanbasic

(10) Patent No.: US 7,669,696 B2
(45) Date of Patent: Mar. 2, 2010

(54) EQUIPMENT FOR PRODUCING SHAFT INFORMATION

(75) Inventor: Faruk Osmanbasic, Cham (CH)

(73) Assignee: Inventio AG, Hergiswil (CH)

( * ) Notice: Subject to any disclaimer, the term of this patent is extended or adjusted under 35 U.S.C. 154(b) by 285 days.

(21) Appl. No.: 11/698,539

(22) Filed: Jan. 26, 2007

(65) Prior Publication Data

US 2007/0187187 A1 Aug. 16, 2007

(30) Foreign Application Priority Data

Jan. 27, 2006 (EP) ................................ 06100919

(51) Int. Cl.
*B66B 1/34* (2006.01)
*B66B 3/02* (2006.01)
*G01B 7/02* (2006.01)

(52) U.S. Cl. ........................ 187/391; 187/393; 187/399

(58) Field of Classification Search ................ 187/283, 187/294, 312, 391–394, 397, 399, 408, 409, 187/414; 33/706, 708; 701/117, 208; 340/905
See application file for complete search history.

(56) References Cited

U.S. PATENT DOCUMENTS 3,963,098 A * 6/1976 Lewis et al. ................. 187/394
4,427,095 A * 1/1984 Payne et al. ................. 187/394
4,433,756 A * 2/1984 Caputo et al. ............... 187/394
4,750,592 A 6/1988 Watt
4,787,481 A * 11/1988 Farrar et al. ................ 187/247
4,798,267 A 1/1989 Foster et al.
4,832,158 A * 5/1989 Farrar et al. ................ 187/316
5,135,081 A * 8/1992 Watt et al. .................. 187/394
5,821,477 A * 10/1998 Gerstenkorn ................ 187/394
5,925,859 A * 7/1999 Miller et al. ............... 187/394
6,435,315 B1 * 8/2002 Zaharia ..................... 187/394
6,622,827 B1 9/2003 Disieno
2002/0104716 A1 * 8/2002 Zaharia ..................... 187/394
2003/0070883 A1 * 4/2003 Foster et al. ............... 187/394
2004/0216962 A1 * 11/2004 Kunz et al. ................. 187/394
2006/0118364 A1 * 6/2006 Birrer et al. ................ 187/394
2007/0227831 A1 * 10/2007 Zaharia ..................... 187/394
2008/0202862 A1 * 8/2008 Dudde et al. ................ 187/393

FOREIGN PATENT DOCUMENTS

DE 44 01 977 A1 7/1995
EP 0 765 836 A2 4/1997
EP 0 792 833 B1 9/1997

* cited by examiner

*Primary Examiner*—Walter Benson
*Assistant Examiner*—Eduardo Colon-Santana
(74) *Attorney, Agent, or Firm*—Ladas & Parry LLP

(57) ABSTRACT

Equipment for producing shaft information consists of a housing, a base, a first cover, a sliding guide with a code carrier and an electronic circuitboard with a sensor for detection of a code on a code carrier and electronic circuits for evaluation of the detected code. The housing has channels of different functions. The sliding guide can be inserted into a sliding guide channel. On movement of the lift cage the code carrier slides in the sliding guide past the sensor.

5 Claims, 6 Drawing Sheets

EQUIPMENT FOR PRODUCING SHAFT INFORMATION

The present invention relates to equipment for producing shaft information, wherein a code carrier spanning at least the height of transportation of a lift cage is provided with a code and a device, which is arranged at the lift cage, for reading and evaluating the code.

BACKGROUND OF THE INVENTION

Equipment for producing shaft information has become known from patent specification EP 0 792 833 B1. A steel strip spanning the entire transportation height serves as a carrier for magnets which mark specific travel regions, such as, for example, the entry region to the story, of a lift cage. Several tracks for arrangement of the magnets are provided at the steel strip. A reading device, with magnet switches is arranged at the lift cage, moves relative to the steel strip when the lift cage is travelling, and guides the strip by means of guides arranged at a U-shaped carrier. Two guides are respectively provided at the carrier limbs, wherein each guide has a groove for guidance of the steel strip.

It is disadvantageous that the reading device and the steel strip of such known equipment are of bulky construction and accordingly consume space in the lift shaft. Moreover, the steel strip can leave the guide grooves or jam in the guide grooves.

Accordingly, the present invention overcomes the problems of the prior art, and fulfils the object of new and improved equipment which securely guides a code carrier for producing shaft information.

BRIEF DESCRIPTION OF THE INVENTION

In accordance with the invention a code carrier, such as extending at least along the length of travel for a lift cage is provided. A code reader and evaluating device has a housing that includes a sliding guide to guide the code carrier past a sensor of the card reader and evaluating device.

The advantages achieved by the invention are substantially to be seen in that the guidance of the code carrier can be produced by means of a housing of favourable cost. The housing may be made from an extruded profile member and closed by means of a base and a cover. The extruded profile member has screw channels, fastening channels, circuitboard channels serving as a circuitboard holder, and a channel for the sliding guide for guidance of the code carrier. A simple exchange of the sliding guide, which is conceived as a wear part and insertable into the channel, can be accomplished and is additionally advantageous. Moreover, a further advantage of the present construction is that during movement of the lift cage the code carrier is not only securely guided, but is also simultaneously cleaned of dust and metal chips. A shaft information system without guidance of the code carrier can also be created by the same housing. The housing is of slender construction and can be attached to the lift cage even in the case of tight space conditions in the shaft.

BRIEF DESCRIPTION OF THE DRAWINGS

The present invention is explained in more detail in the following description and by way of the accompanying figures, in which.

DETAILED DESCRIPTION OF THE INVENTION

Figure 1:
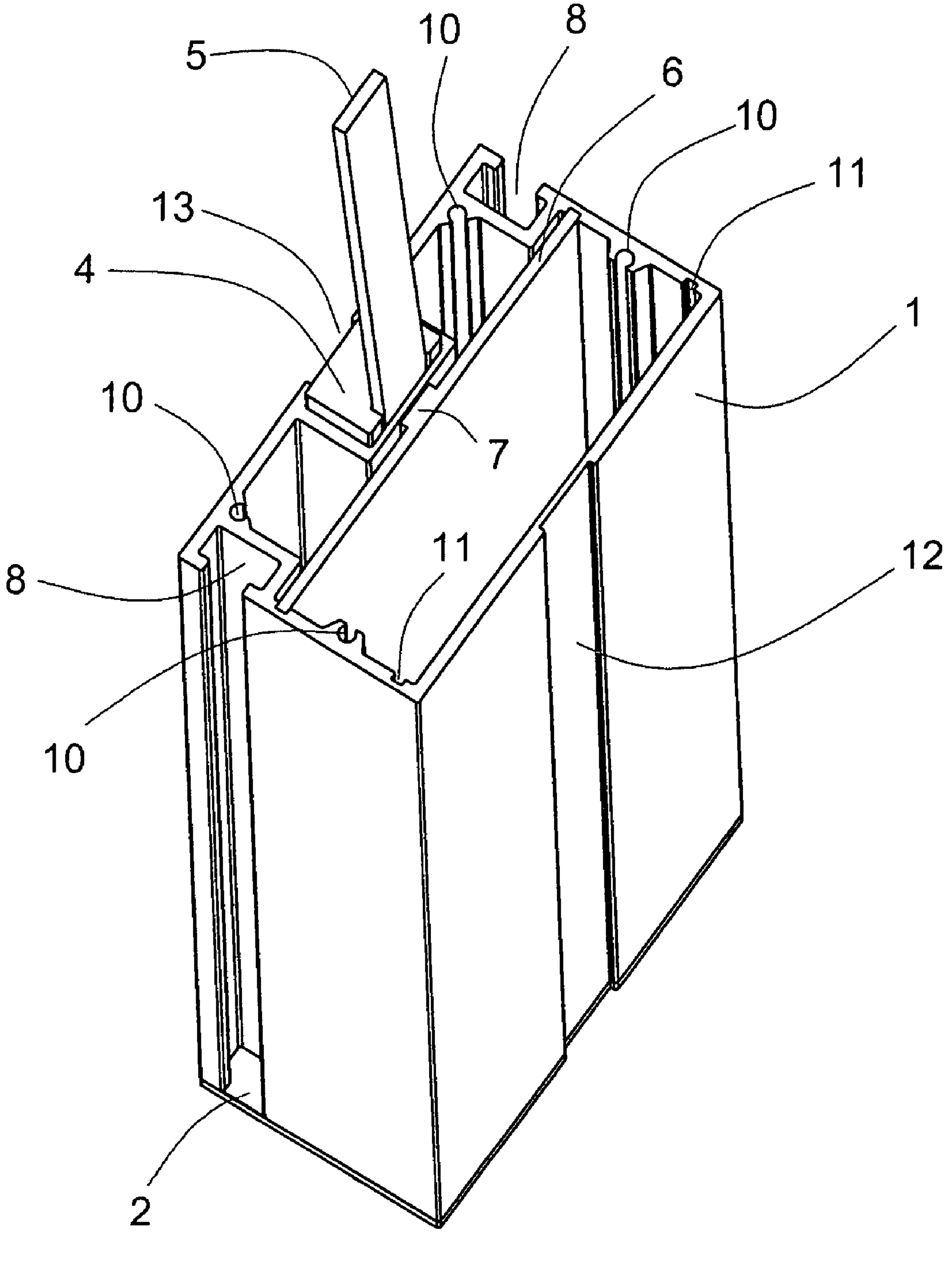
FIG. 1 is a perspective view of an equipment for producing shaft information, in accordance with the invention.

FIG. 1 shows an equipment for producing shaft information, comprising a housing 1, a base 2, a first cover 3 (illustrated in FIG. 3), a sliding guide 4 with a code carrier 5 and an electronic circuitboard 6 with a sensor 7 for detection of a code located on the code carrier 5 and electronic circuits (not shown) for evaluation of the detected code. The housing 1 is made from, for example, an extruded aluminium profile member and has channels for different functions. Fastening channels provided for reception of at least one screw head or at least one nut are denoted by 8, wherein the screws or nuts connect the housing 1 with the frame of a lift cage. The first cover 3 is mounted by means of first screws 9 (FIG. 3) to the housing 1, wherein the first screws 9 can be screwed into screw channels 10 of the housing. The flanged sliding guide channel into which a sliding guide 4 can be inserted and retained is denoted by 13. As shown, channel 13 is an exterior channel. On movement of the lift cage the code carrier 5 slides in the sliding guide 4 past the sensor 7.

Figure 2:
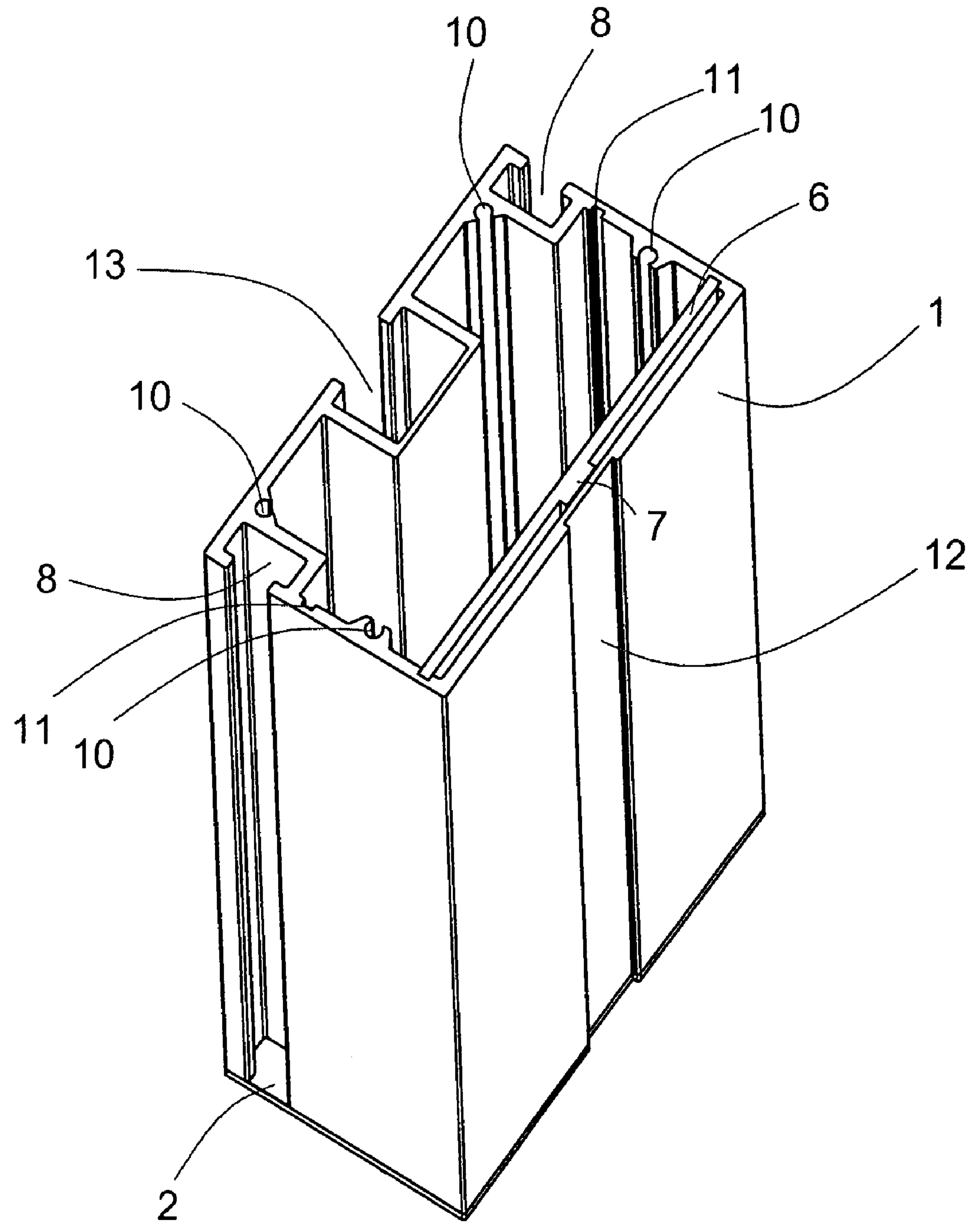
FIG. 2 is a perspective view of an alternate embodiment of the equipment.

FIG. 2 shows an alternative embodiment of the equipment, wherein the code carrier 5 is unguided. Provided at the housing 1 are not only a first pair of circuitboard channels 11 for guidance and fixing of the electronic circuitboard 6 according to the arrangement of FIG. 1, but also a second pair of circuitboard channels 11 for guidance and fixing of the electronic circuitboard 6 as shown in the figure. The sensor 7 of the circuitboard 6 shown, is oriented towards a groove 12 extending over the entire height of the housing, wherein a code carrier 5 during movement of the lift cage slides past the groove 12. The now unused sliding guide channel 13 can be used as a fastening channel for reception of screw heads to mount the housing to a lift cage.

Figure 3:
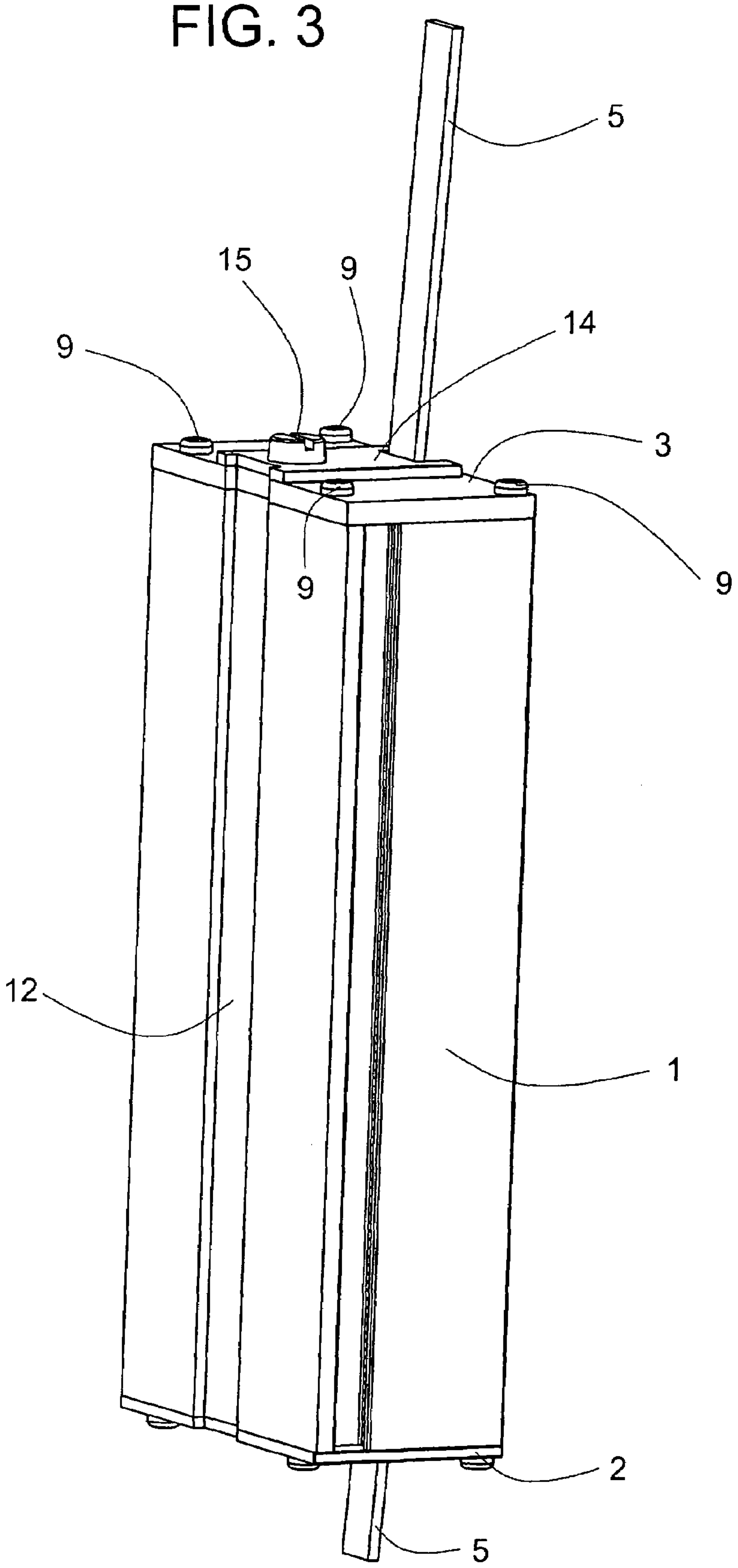
FIG. 3 is a perspective view of the equipment, presenting further details thereof.
Figure 4:
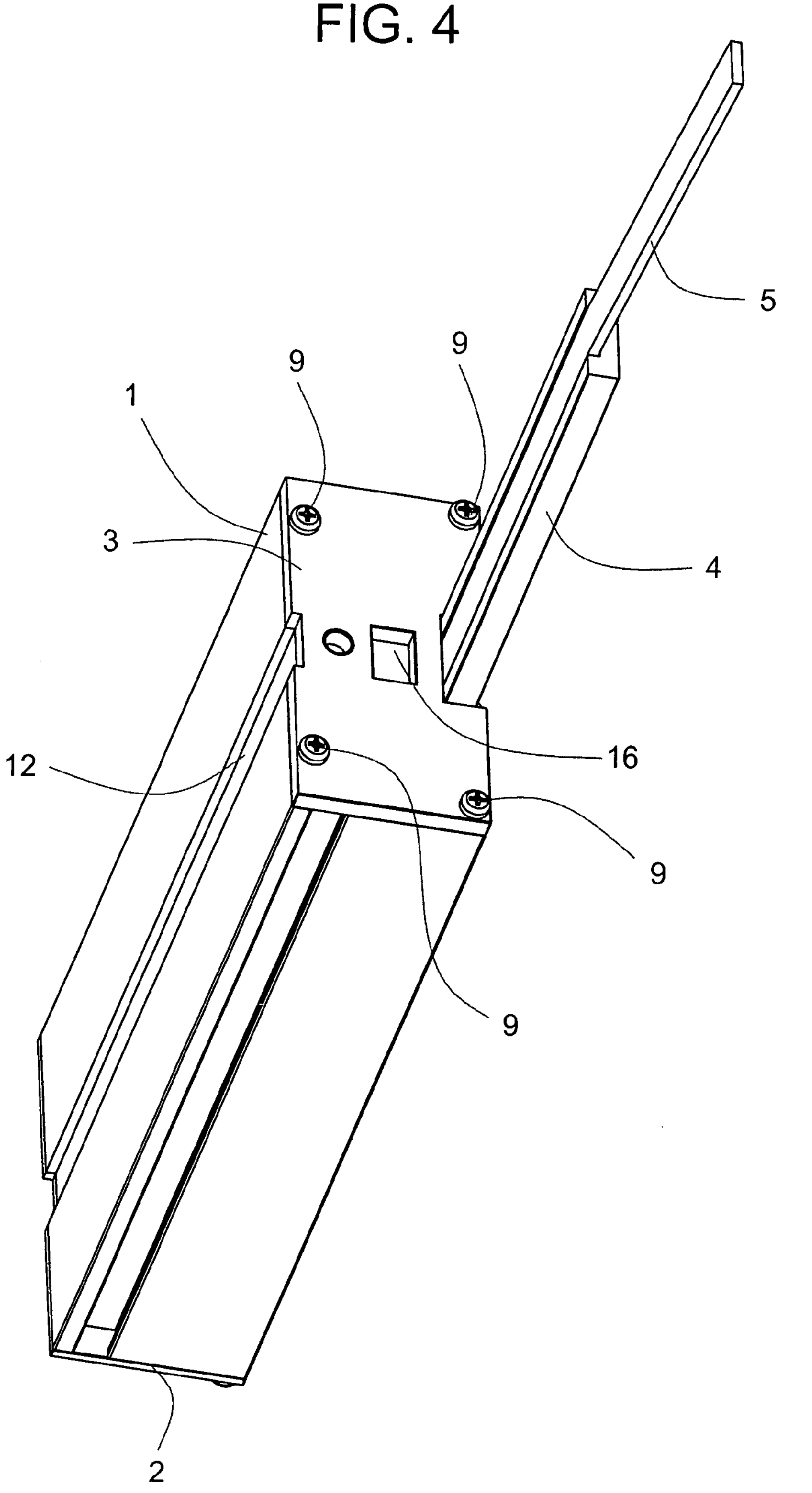
FIG. 4 is a perspective view of a sliding guide, which can be pushed into a housing, for guiding a code carrier.

FIG. 3 shows details of the equipment for producing shaft information with closed housing 1. A second cover 14, which fixes the sliding guide 4, which may be constructed as a wear part—in the vertical direction at the top, is arranged at the first cover 3 of the housing 1. The sliding guide 4 rests on the housing base 2 at the bottom of the housing. To exchange or replace the sliding guide 4 screw 15 is released, the second cover 14 removed, and the worn sliding guide 4 pulled out of the sliding guide channel 3 as shown in FIG. 4. It is not necessary, when the sliding guide 4 is exchanged, to change the positions of either the electronic circuitboard 6 with the sensor 7 or the code carrier 5. The entire replacement takes less than a minute. As depicted, the sliding guide may extend substantially the full height of the housing.

Removal of the second cover 14 also exposes an opening 16 which is arranged in the first cover 3 and through which microswitches arranged at the electronic circuitboard 6 can be reached. When placed in operation, the equipment for producing shaft information is configured by setting the microswitches depending on the respective form of lift installation.

Figure 5:
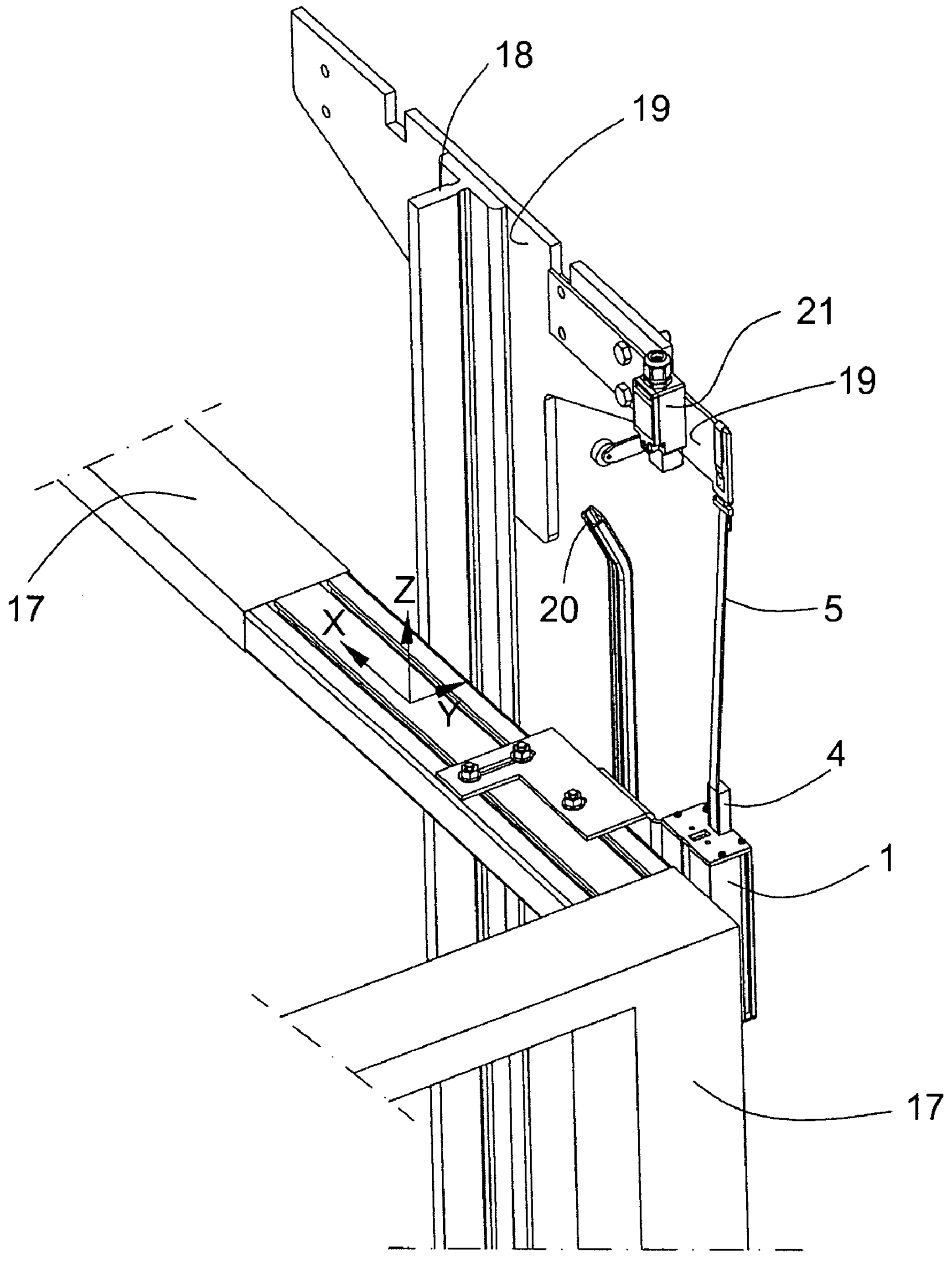
FIG. 5 is a perspective view of an arrangement of the equipment for producing shaft information mounted to a lift cage.
Figure 6:
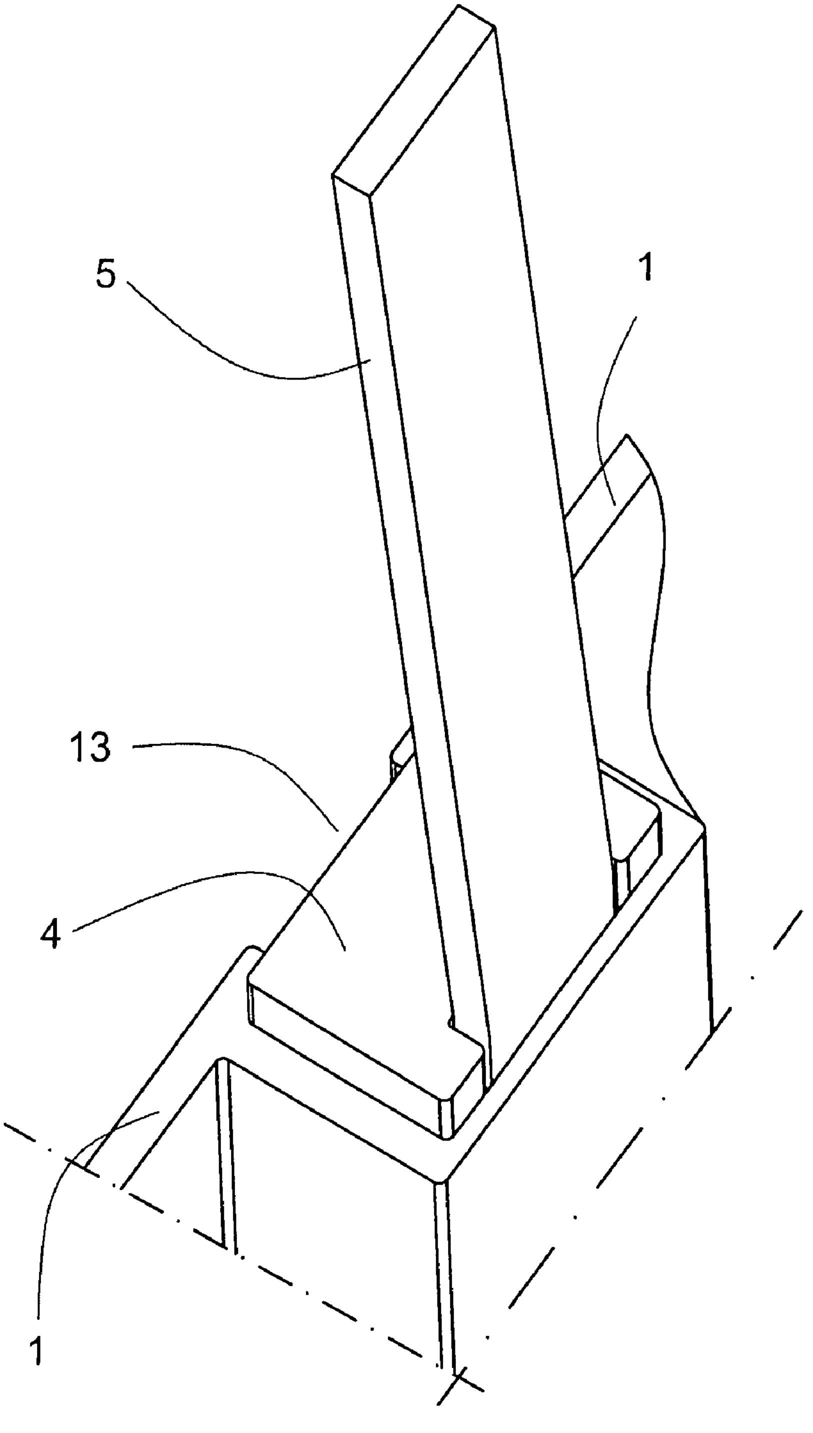
FIG. 6 is a perspective view showing the sliding guide with the code carrier in a sliding guide channel.

FIG. 5 shows an arrangement of the equipment for producing shaft information at a lift cage. The housing 1 is mounted to a cage frame 17 of the lift cage, wherein the housing 1 is adjustable in the x, y and z directions to properly receive the code carrier 5. The code carrier may be supported, for example, by an arm 19, to which one end of the code carrier 5 is fixed, arranged at a guide rail 18 for the lift cage. The other end of the code carrier 5 is fixed in a comparable manner in the shaft pit. A vane 20 is also mounted to the cage frame and actuates a limit switch 21, which is located on the arm 19, if the lift cage travels past the uppermost story. FIG. 6 details the alignment of the housing, the sliding guide 4 aligned with the code carrier 5 in the sliding guide channel 13.

In the embodiment as set forth the code carrier 5 is a code strip rectangular in cross-section carrying a magnetic code. Other carrier cross-sections or shapes, for example circular, oval, square, triangular, etc., are also possible. The recess of the sliding guide 4 is shaped in accordance with the respective carrier cross-section, wherein the code carrier of the lift cage slides through the sliding guide 4 during lift cage travel substantially without friction.

I claim:

1. Equipment for producing transportation lift shaft information in a lift having a code carrier extending along a transportation height of a lift cage and carrying coded information, the equipment comprising a housing mounted to the lift cage, a device for reading and evaluating the code located in the housing, the housing having an interior guide channel in which a removable sliding guide element is mounted, the sliding guide element being mounted within the housing and having means for slidably positioning and supporting the code carrier in the sliding guide element for reading and evaluating the code by the reading and evaluating device as the lift cage travels along the transportation height.

2. The equipment according to claim 1, wherein the housing is formed from extruded aluminum profile member and has fastening channels, circuit board channels, screw channels, a base and a cover.

3. The equipment according to claim 1, wherein the housing further includes a second cover to fix the sliding guide element in a vertical direction mounted to the first cover, the second cover being removable to permit exchange of the sliding guide element.

4. The equipment according to claim 1, wherein the code carrier is guided on three sides by the sliding guide element and on a fourth side by a wall of the guide element.

5. The equipment according to claim 1, wherein the sliding guide element extends within the housing a full height of the housing.

* * * * *